United States Patent Office 2,992,229
Patented July 11, 1961

2,992,229
2-(2-CYCLOHEXENYLTHIO)BENZOXAZOLE
John J. D'Amico, Charleston, W. Va., assignor to Monsanto Chemical Company, St. Louis, Mo., a corporation of Delaware
No Drawing. Filed Nov. 19, 1959, Ser. No. 854,019
1 Claim. (Cl. 260—307)

This invention relates to 2-(2-cyclohexenylthio)-benzoxazole which may be prepared as follows:

To a stirred solution comprising 15.1 grams (0.1 mole) of 2-mercaptobenzoxazole, 16 grams (0.1 mole) of 25% sodium hydroxide and 100 ml. of water was added in one portion 16.1 grams (0.1 mole) of 3-bromocyclohexene. After heating at 80–90° C. for 8 hours, the product was cooled to 25° C. and extracted with 300 ml. of ethyl ether. The ether solution was washed with water until neutral to litmus, dried over sodium sulfate and the ether removed in vacuo (1–2 mm.) at a maximum temperature of 80–90° C. The product was obtained as an amber oil in 95.2% yield. Analysis gave 5.6% nitrogen and 13.3% sulfur as compared to 6.1% nitrogen and 13.9% sulfur calculated for $C_{13}H_{13}NOS$.

The product is an effective pre-emergent herbicide. To demonstrate the useful properties, 2-(2-cyclohexenylthio)-benzoxazole was applied to soil containing germinating seedlings, at the rate of 25 pounds per acre and the phytotoxicity observed. It was noted that wild oats, rye grass, foxtail, barnyard grass, crab grass and pigweed were severely injured. Where injury was observed, it was accompanied and enhanced by chlorosis. In other words, the toxicant interfered with the chlorophyll mechanism in plants. Herbicidal activity and noticeable chlorosis were still evident at a dosage of 5 pounds per acre.

It is intended to cover all changes and modifications of the examples of the invention herein chosen for purposes of disclosure which do not constitute departures from the spirit and scope of the invention.

What is claimed is:
2-(2-cyclohexenylthio)benzoxazole.

References Cited in the file of this patent
Moore: Chem. Abstracts, vol. 47, col. 10523 (1953).